United States Patent [19]
Decker

[11] Patent Number: 6,040,822
[45] Date of Patent: Mar. 21, 2000

[54] ILLUMINATED KEYBOARD SYSTEM

[76] Inventor: Mark R. Decker, 2245 Palmer Dr., St. Helena, Calif. 94574

[21] Appl. No.: 08/959,674

[22] Filed: Oct. 29, 1997

Related U.S. Application Data

[63] Continuation-in-part of application No. 08/502,913, Jul. 17, 1995, Pat. No. 5,684,513.

[51] Int. Cl.[7] .............................. G09G 5/00; G09G 3/36; H03K 17/94
[52] U.S. Cl. .......................... 345/168; 345/172; 345/102; 341/22
[58] Field of Search ..................................... 345/102, 168, 345/170, 172, 905; 341/22, 23, 27; 36/380

[56] References Cited

U.S. PATENT DOCUMENTS

| | | | |
|---|---|---|---|
| 5,384,516 | 1/1995 | Kawabata et al. | 315/160 |
| 5,397,867 | 3/1995 | Demeo | 200/5 A |
| 5,408,060 | 4/1995 | Muurinen | 200/314 |
| 5,465,193 | 11/1995 | Tracy | 362/31 |
| 5,703,625 | 12/1997 | Snider et al. | 345/168 |

*Primary Examiner*—Richard A. Hjerpe
*Assistant Examiner*—Duc Dinh
*Attorney, Agent, or Firm*—Sawyer Law Group

[57] ABSTRACT

An electronic luminescence keyboard system in a device which includes one or more keypads and an illuminated panel which displays information responsive to the pressing of at least one keypads is disclosed. The improvement comprises a conductor element for conducting a portion of the light from the illuminated panel and illuminator element coupled to the conductor element for illuminating one or more keypads with the portion of the light from the illuminated panel.

Through the use of a portion of the light from the display panel is utilized to illuminate the keyboard thereby allowing for observation of the keypads on the to keyboard when the surrounding area is dimly lit. The ELK system has no effect on the power consumption on the device. In an embodiment the ELK system provides for backlighting the keyboard. In a second embodiment the ELK system provides light to a top portion of the keypads.

15 Claims, 5 Drawing Sheets

ILLUMINATED KEYBOARD SYSTEM

The present application is a Continuation-in-Part of U.S. patent application Ser. No. 08/502,913, filed Jul. 17, 1995 now U.S. Pat. No. 5,684,513.

FIELD OF THE INVENTION

The present invention relates to an electrical keyboard, and more particularly to a lighted keyboard utilized in a variety of environments.

BACKGROUND OF THE INVENTION

A wide variety of keyboards are utilized for data entry terminals and remote control terminals. More particularly many laptop computers, personal digital assistants, palmtops, color and black-and-white notebooks, sub-notebooks, remote teleprompter presenter screen-keyboards, pagers, alpha-numeric pager-organizers, desktop computers, audio and/or video devices for recording, editing and/or playback, facsimile machines, TVs, video games, airplane entertainment consoles, avionics systems, automotive systems, navigation systems, musical instruments and the like utilize keyboards of one or more keys for inputting of information. One of the issues with such devices is their use in environments where there is not sufficient light to see the keys. For example, in an airplane or the like, while using a portable computer, the lights may be turned off or lowered due to the viewing of a movie or the like on the airplane. It would be useful to have an illuminated keyboard which will allow one to actually see the keys when inputting information. Similarly, in a situation where there are several people in a particular room looking at a TV program or the like, in the evening, in which it is determined that most of the normal lights should be turned off, it would similarly be useful to provide a keyboard which is lighted. When using a camcorder in low light conditions, it would be useful to have a lighted keyboard for functions such as rewind, fast forward, play, record, exposure control, titling, and others.

There are many lighting arrangements utilized for keyboards. However, these conventional lighting arrangements have the disadvantage of requiring an additional light source which can consume power for illuminating the keypads as well as requiring relatively complex lighting arrangements for providing such illumination.

Accordingly, what is needed is a lighting arrangement for a device that includes a keyboard that is low cost, easy to implement, does not consume additional power and is adaptable to existing devices, including portable devices. The present invention addresses such a need.

SUMMARY OF THE INVENTION

An illuminated keyboard system in a device which includes at least one keypad and an illuminated panel which displays information responsive to the pressing of at least one keypad is disclosed. The improvement comprises a conductor element for conducting a portion of the light from the illuminated panel and illuminator element coupled to the conductor element for illuminating the plurality of keypads with the portion of the light from the illuminated panel.

A portion of the light from the illuminated panel is utilized to illuminate the keyboard thereby allowing for observation of one or more keypads on the keyboard when the surrounding area is dimly lit. The illuminated keyboard system has no effect on the power consumption of the device. This is valuable for all devices, and is especially useful with battery operated devices. In an embodiment the illuminated keyboard system provides for backlighting the keyboard. In a second embodiment the illuminated keyboard system provides light to a top portion of the keypads. It should be noted that the 'top portion of the keypad(s)' or 'top surface of the keypad(s)' refers to the part of the keypad that is visible or that is touched or depressed to activate the key. Clearly in many types of equipment, for example in camcorders, the top portion or top surface of the keypad may actually be on the top, on the side or on the bottom of the equipment.

DETAILED DESCRIPTION

Figure 1:
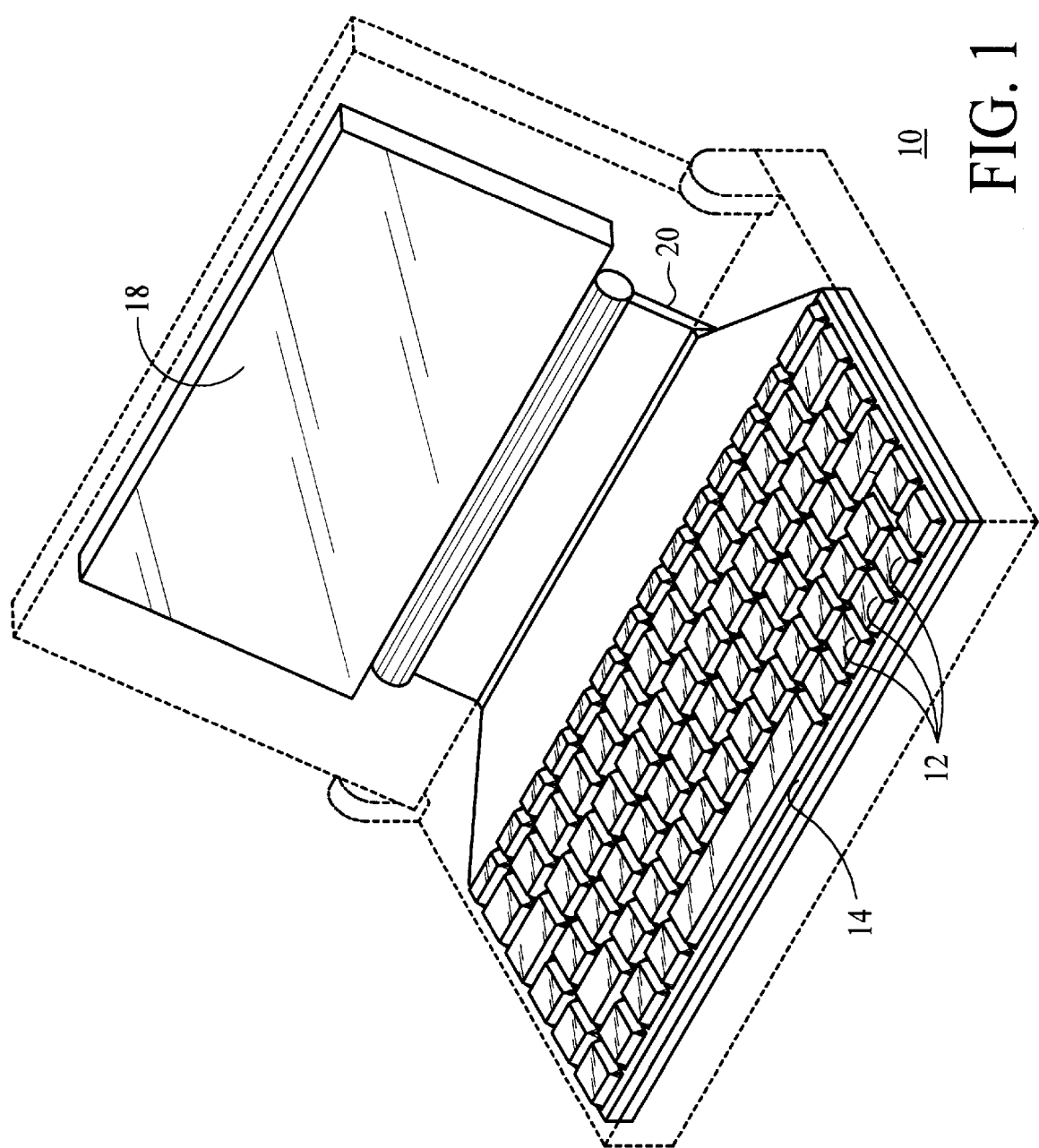
FIG. 1 is a perspective view of an illuminated keyboard system in accordance with the present invention.

The present invention relates to an improvement in the lighting of one or more keypads in a device which includes a keyboard. The following description is presented to enable one of ordinary skill in the art to make and use the invention and is provided in the context of a patent application and its requirements. Various modifications to the preferred embodiment and the generic principles and features described herein will be readily apparent to those skilled in the art. Referring now to FIG. 1, what is shown is a perspective view of a portable computer 10 including keypads 12 on a keyboard 14. The portable computer 10 also includes display panel 18 which utilizes the illuminated keyboard 20 system of the present invention. One or more keypads when pressed are utilized to provide images on the display panel. The computer 10 is shown for illustrative purposes only. It is well understood that the illuminated keypad system 20 could be utilized in conjunction with any type of device which includes one or more keypads 12 such as laptop computers, personal digital assistants, palmtops, color and black-and-white notebooks, sub-notebooks, remote teleprompter presenter screen-keyboards, pagers, alpha-numeric pager-organizers, desktop computers, audio and/or video devices for recording, editing and/or playback, facsimile machines, TVs, video games, airplane entertainment consoles, avionics systems, automotive systems, navigation systems, and musical instruments. The critical feature is that the device has some sort of illuminated panel. The illuminated keyboard system 20 utilizes the existing illuminated panel light source as the lighting element for one or more keypads. Through this cooperation of elements, one or more keypads can be illuminated while the device is being utilized in an area where the normal lighting is decreased.

Figure 2:
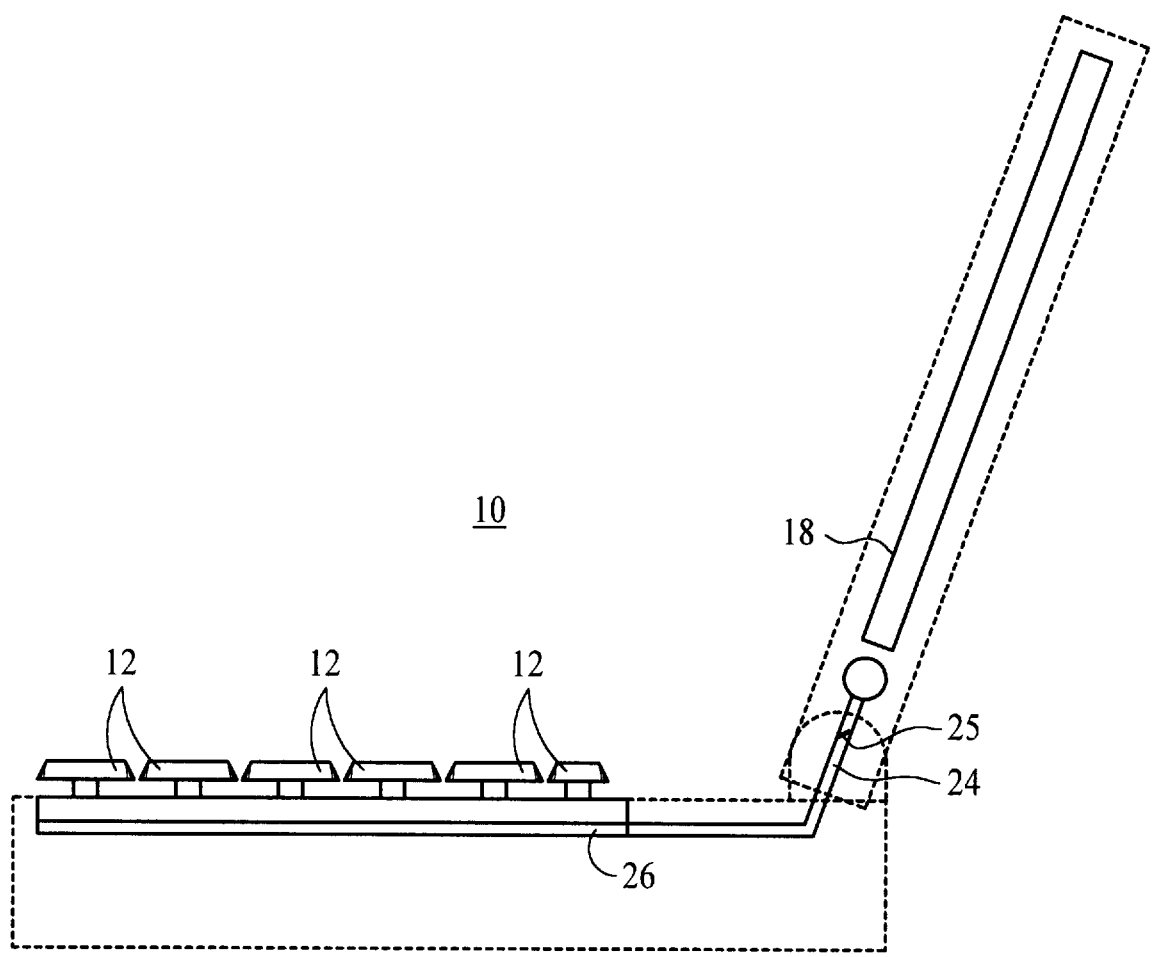
FIG. 2 is a side view of a first embodiment of such a system.

To more specifically describe the present invention, refer now to FIG. 2, which is a side cutaway view of one embodiment of the present invention. As is seen in this embodiment, in the illuminated keyboard system 20, a portion of the light is piped via a light pipe coupler 24 from the display panel 18 to the underside of one or more keypads via a light transparent support plane or backlight panel 26. A portion of the light from the display panel 18 is then utilized to illuminate the back of one or more keypads 12 in the backlight panel 26.

Applicant has noted that there are two different scenarios present when utilizing such devices. One scenario is where the ambient (surrounding) light is high. In that environment, the light from the display panel 18 must be at a high level to provide the contrast to allow for reading of the display. The second scenario is where the ambient light is low. In that environment, the light from the display panel 18 can be reduced because the contrast between the display panel 18 and the ambient light is high enough that the display panel 18 can be read with a significant reduction of the light produced thereby.

In one embodiment, a gate 25 can be placed in the light pipe coupler 24 which can be moved to various positions to selectively allow or prevent light from entering the backlight panel 26. The gate 25 can be operated either manually or automatically. It should be readily recognized that the gate 25 can be implemented in a variety of ways and those implementations would be within the spirit and scope of the present invention.

Figure 3:
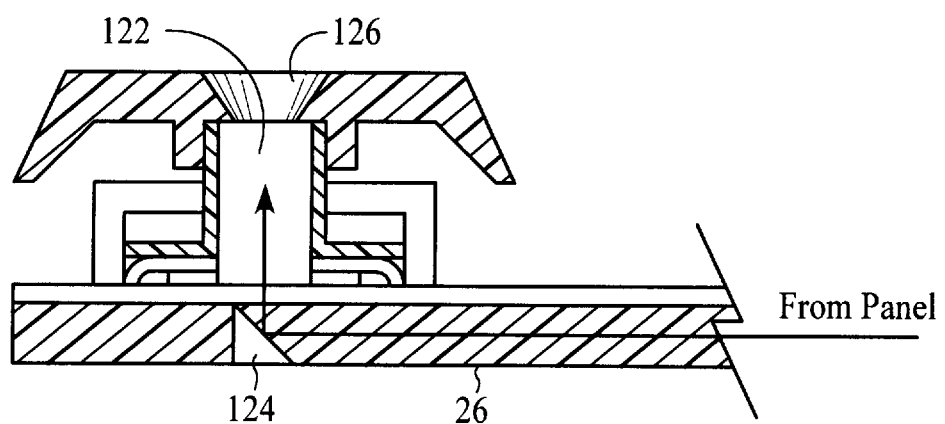
FIG. 3 is a view of one key utilized in such a system.

To illustrate clearly how the system 20 shown in FIG. 2 is utilized on a single keypad 12, refer now to FIG. 3 which shows a keypad which includes a hollow, transparent or translucent portion 122 for receiving the light from backlight panel 26. The light is then reflected as is seen off reflective member 124 up through the hollow, transparent or translucent portion 122 of the keypad 12. The keypad in turn has a translucent or transparent portion 126 to which the light can be observed. Accordingly, the light from the display panel 18 is used advantageously to provide luminescence to one or more keypads 12. Heretofore most all previously known systems for providing luminescence to a plurality of keypads have utilized an electronic light source for providing the lighting to a keypad. The present invention uses lighting of the display panel 18 to provide the illumination to one or more keypads 12.

One of ordinary skill in the art readily recognizes that the illuminated keyboard system 20 shown in FIGS. 2 and 3 is but one embodiment of a system which could advantageously utilize the light source of the display panel 18 for illuminating the keypad.

Figure 4:
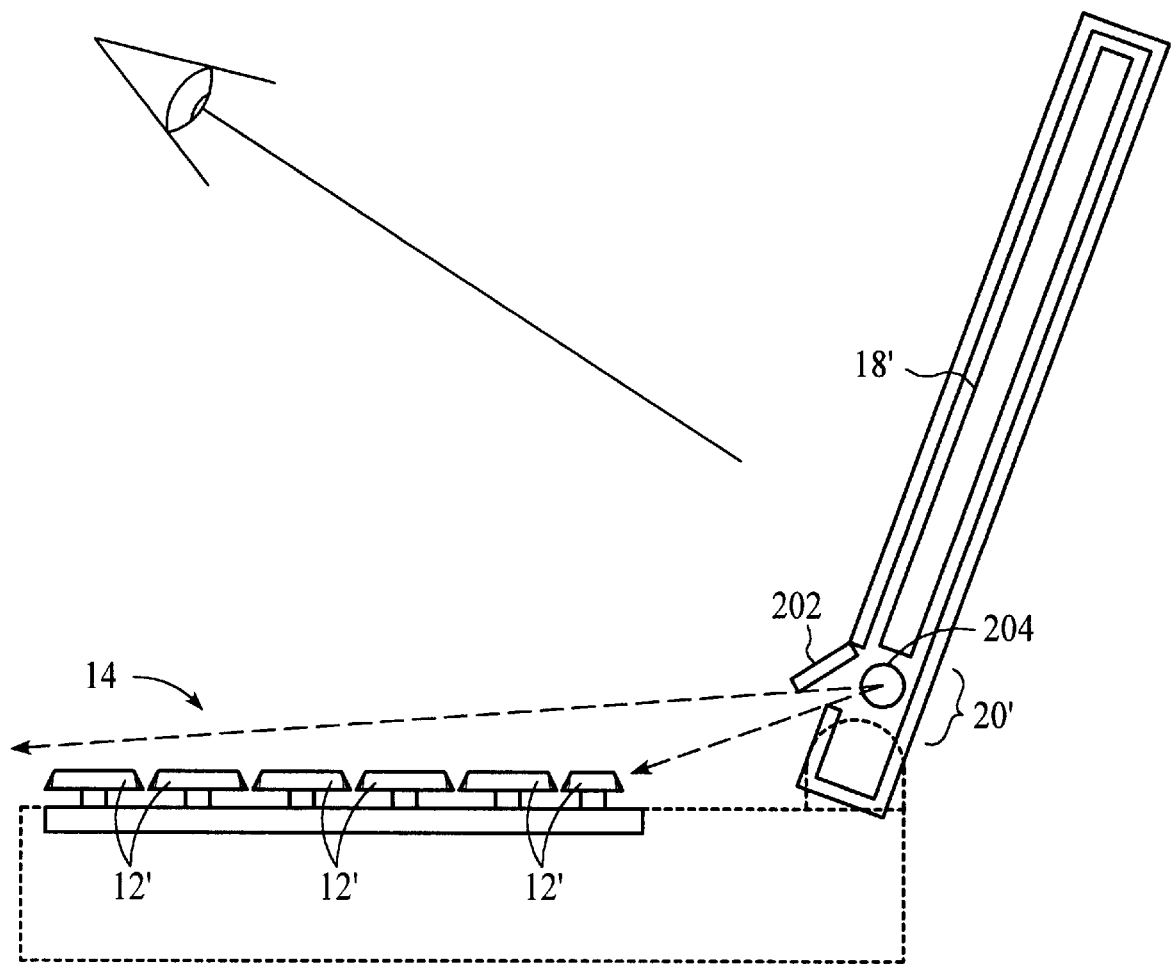
FIG. 4 is a second embodiment of an illuminated keyboard system in accordance with the present invention.

To more particularly show another embodiment, refer now to FIG. 4, which is a partially cut away view of a computer 10'. In this embodiment rather than piping the light to the backside of one or more keypads 12, the illuminated keyboard system 20' reflects a portion of the light from the display panel 18' to the top portion of one or more keypads 12 through the use of reflecting member 202 in combination with a light coupler 204. Through the combination of the light coupler 204 and the reflecting member 202 the top portion of one or more keypads 12' are illuminated. This system provides light to the keyboard 14 with minimal modification to the device.

Figure 5:
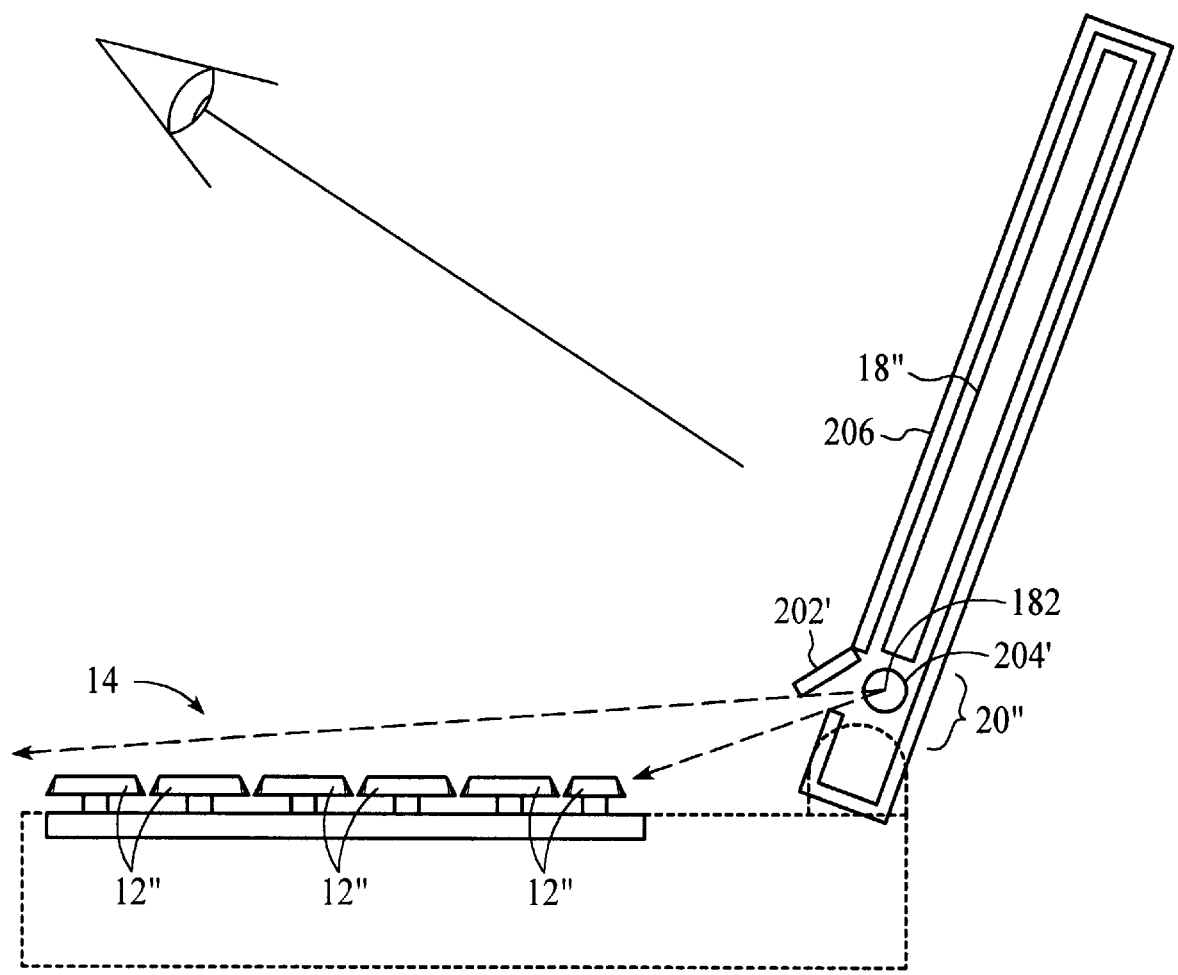
FIG. 5 is an additional embodiment.

An even simpler variation of the above is shown in the embodiment of FIG. 5. In FIG. 5, the display panel 18" contains a light source 182 conveniently located so that light from the light source 182 falls on one or more keypads 12" after passing through a window 208 in covering 206, and a window in display panel 18". These windows could each be openings, or could be translucent or transparent covers. In some situations, the display panel 18" may itself form the outer casing, in which case covering 206 may not be present. In any event, an optional gate 202' can be used to automatically or manually adjust or totally block the amount of light falling on one or more keypads. It should be readily recognized that the optional gate 202' can be implemented in a variety of ways and those implementations would be within the spirit and scope of the present invention, including sliding doors as shown in cross-section in FIG. 5, or pivoting doors similar to member 202 in FIG. 4.

Figure 6:
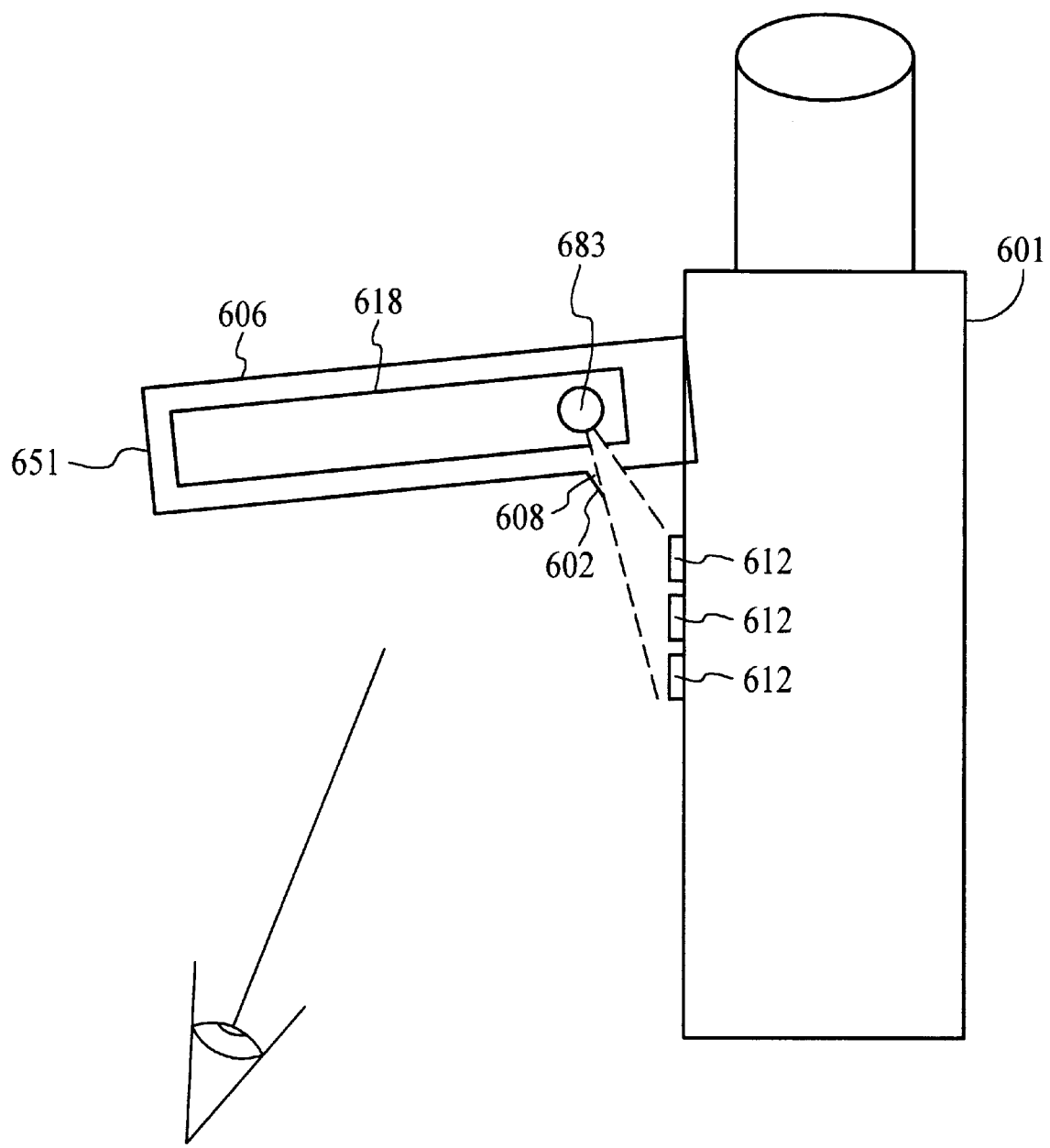
FIG. 6 is an embodiment in a camcorder.

Referring now to FIG. 6, another variation of the invention is shown in which a camcorder 601 includes a swing-out display assembly 651. The display assembly 651 includes a covering 606 and a display 618. As is customary with existing camcorders, the display 618 can show live or recorded video. On the side of the camcorder are a number of keypads 612 which could be for functions such as rewind, fast forward, play, record, exposure control, titling and the like.

A light source 683 provides illumination for the display 618. Light from light source 683 also passes through window 608 to illuminate keys 612. This window could be an opening, or could be a translucent or transparent cover. In some camcorders, which would also be embodiments of the invention, the display panel 618 may from the outer casing of display assembly 651, in which case covering 606 may not be present.

An optional gate 602 can be used to manually or automatically adjust or totally block the amount of light falling on one or more keypads 612. It should be readily recognized that the optional gate 602 can be implemented in a variety of ways and those implementations would be within the spirit and scope of the present invention.

Accordingly, as is seen, a simple and inexpensive system for providing lighting to a keyboard is provided by actually utilizing the light generated by a device associated with the keyboard. In so doing, a device can be used in a variety of environments in which the surrounding environment is not well lit without adding undue cost and expense to the device system. In addition since the illuminated keyboard system utilizes the existing light source on the device associated with the keypad, the illuminated keyboard system does not affect the power consumption of the device.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined solely by the following claims.

I claim:

1. In a device which includes at least one key pad and a panel for displaying information responsive to the pressing of at least one keypad, an illuminated keypad system comprising a light source within the panel for illuminating the panel,
a window for allowing a portion of the light from the light source to illuminate at least one keypad.

2. The illuminated keypad system of claim 1 which includes a gate means for adjusting the illumination of at least one keypad.

3. In a device which includes at least one key pad and a panel for displaying information responsive to the pressing of at least one keypad, an illuminated keypad system comprising a light source within the panel for illuminating the panel,
a conductor element coupled to the light source to conduct light from the light source so as to illuminate at least one keypad.

4. The illuminated keypad system of claim 3 in which the conductor element comprises a backlight plane.

5. The illuminated keypad system of claim 3 which includes a gate means for adjusting the illumination of at least one keypad.

6. A device comprising at least one keypad;

a light source;

a panel being illuminated by the light source, the light source being located within the panel, the panel displaying information responsive to the pressing of at least one keypad and a window allowing for the emission of a portion of the light from the light source onto at least one keypad.

7. The device of claim 6 which includes a gate means for adjusting the illumination of at least one keypad.

8. A fixture, for use in electronic equipment that has one or more keypads, said fixture comprising a display area for displaying information, a light source for illuminating the display area, and a window over at least part of the fixture which allows light to leave for the illumination of at least one keypad.

9. The fixture of claim 8 where the window includes a transparent cover.

10. The fixture of claim 8 where the window includes a translucent cover.

11. The fixture of claim 8 which includes a conductive element to help guide light to at least one keypad.

12. A fixture, for use in electronic equipment that has one or more keypads, said fixture comprising a display area for displaying information, a light source for illuminating the display area, and a window over at least part of the light source which allows light to leave for the illumination of at least one keypad.

13. The fixture of claim 12 where the window includes a transparent cover.

14. The fixture of claim 12 where the window includes a translucent cover.

15. The fixture of claim 12 which includes a conductive element to guide light to at least keypad.

* * * * *